D. W. ROSS.
PIPE COUPLING.
APPLICATION FILED OCT. 10, 1910.
1,021,485.
Patented Mar. 26, 1912.
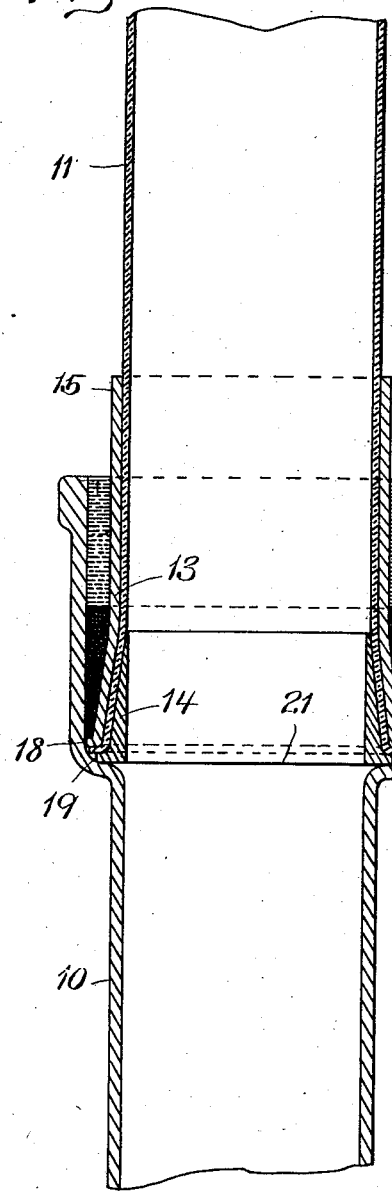
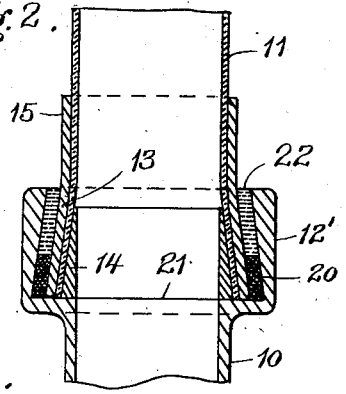
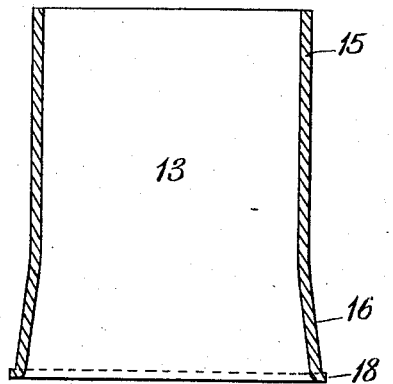
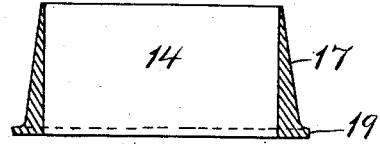
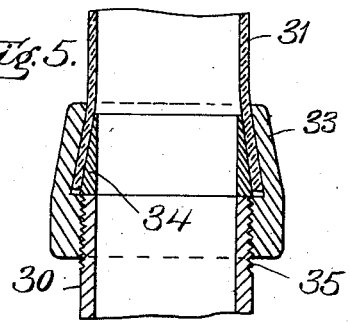
Witnesses:
W. P. Abell
P. W. Pezzetti
Inventor:
David W. Ross
by Wright Brown Quimby May
Charles F. Brown
Attys.
COLUMBIA PLANOGRAPH CO., WASHINGTON, D. C.

UNITED STATES PATENT OFFICE.

DAVID W. ROSS, OF BOSTON, MASSACHUSETTS.

PIPE-COUPLING.

1,021,485.   Specification of Letters Patent.   Patented Mar. 26, 1912.

Application filed October 10, 1910. Serial No. 586,146.

*To all whom it may concern:*

Be it known that I, DAVID W. ROSS, of Boston, in the county of Suffolk and State of Massachusetts, have invented certain new and useful Improvements in Pipe-Couplings, of which the following is a specification.

This invention relates to pipe couplings, and its object is to provide an improved means of connecting a pipe composed of ductile metal with a pipe composed of hard, rigid metal. At the present time, whenever two pipes of the character stated are to be coupled by a watertight connection, it is customary to form what is called a wipe joint. Wipe joints are objectionable for various reasons, one of which is the length of time required to make a perfect joint. The expense involved in making a wipe joint depends largely upon the amount of time required, as well as upon the cost of the solder by which the joint is made. Another objection is that the solder oftentimes enters into the interior of the pipes through the crack between their meeting ends, and in this way obstructs the passage. It often happens that the passage is so far obstructed by solder that it is necessary to entirely remove the joint and a portion of the ductile pipe and to insert a new piece, and perform the operation of forming a new joint.

Of the accompanying drawings which illustrate the invention embodied in various forms: Figure 1 represents a longitudinal section of two pipe members and a coupling device, one of said pipe members having a bell-shaped end. Fig. 2 represents a similar section in which the bell-shaped pipe has a contracted mouth. Fig. 3 represents a longitudinal section of one of the coupling members included in Fig. 1. Fig. 4 represents a longitudinal section of the other coupling member. Fig. 5 represents a longitudinal section of the device adapted to connect two pipes of equal diameter.

The same reference characters indicate the same parts wherever they occur.

In the form shown by Figs. 1 to 4, the coupling is designed to form connection between the bell-shaped end of a pipe composed of hard, rigid metal, such as cast iron, and a smaller pipe of ductile metal such as lead. The iron pipe, hereinafter designated the hard pipe, is indicated at 10, and the lead pipe, hereinafter designated the ductile pipe, is indicated at 11. The hard pipe is formed with a bell-shaped end or socket 12 which is a common form of construction for receiving the smaller end of a similar pipe. Hitherto it has not been possible to form a satisfactory joint between a ductile pipe and a hard pipe by inserting the end of the ductile pipe in the enlarged end of the hard pipe. The reasons for this are well known, but they may be stated, nevertheless. When an end of a pipe of relatively small diameter is inserted in a pipe end of relatively large diameter, the joint is usually made tight by placing a quantity of material such as oakum in the annular space between the telescoping ends by compressing such material with considerable pressure and by finally sealing the same with molten lead. This form of connection is only used when the two pipes are composed of relatively hard, rigid metal, such as cast iron. If the same method were adopted when one of the pipes is composed of lead, the compression of the oakum would result in distorting the lead pipe so the joint could not be made tight, and, furthermore, the lead pipe would become melted by the application of molten lead if the molten lead were permitted to come into contact with the lead pipe.

The coupling device shown by Figs. 1 to 4 makes it possible to connect a ductile and readily fusible pipe with an iron pipe in the same manner as if the two pipes were composed of iron. The coupling device comprises two sleeves of hard rigid metal, such as cast iron, indicated respectively at 13 and 14. (See Figs. 3 and 4). These two sleeves are designated by the terms outer and inner, because they are placed respectively outside and inside the ductile pipe. The outer sleeve 13 is preferably formed with a cylindric portion 15 whose internal diameter will admit the ductile pipe 11. One end of the outer sleeve is flared as indicated at 16, the internal surface of the flared end being frusto-conical. The flared end of the outer sleeve is slightly smaller than the internal diameter of the bell-shaped end 12, which may be regarded as the pipe to which the ductile pipe is connected, without regard to the smaller diameter of the portion 10. The length of the outer sleeve 13 is preferably such that its end 15 will extend considerably beyond the end of the larger pipe 12 when the coupling is inserted at the desired position. The inner sleeve 14 is formed with a frusto-conical external surface 17. The external diameter of the inner sleeve at its smaller end is very slightly less than the internal diameter of the ductile pipe when the ductile pipe is in its normal or original condition. The sleeves 13 and 14 are both preferably provided with external flanges at the ends which are inserted foremost in the larger pipe 12, these flanges being indicated respectively at 18 and 19.

The connection between the ductile pipe and the hard pipe may be made in the following manner: The smaller end of the outer sleeve 13 is first applied to the ductile pipe and may be manually held in the same relative position as that shown by Figs. 1 and 2. While the ductile pipe and outer sleeve are so held, the smaller end of the inner sleeve 14 is inserted in the ductile pipe and is driven into the pipe as far as it will go. As the inner sleeve advances, its external surface 17 expands the ductile pipe against the inner face of the flared end 16 of the outer sleeve. The ductile pipe therefore becomes flared and compressed between the two sleeves. The ductile pipe with the two sleeves attached may now be placed in the large pipe 12, and oakum may be placed in the annular space between the outer sleeve and the pipe 12, as indicated at 20. The flange 19 of the inner sleeve may be seated against the shoulder 21 at the meeting portions of the main pipe 10 and larger portion 12. After the oakum 20 has been compressed to the desired degree, molten lead 22 may be poured into the annular space between the pipe 12 and the sleeve 13. The smaller end of the sleeve 13 extends beyond the end of the pipe 12 and therefore prevents the molten lead from coming into contact with the ductile pipe. The molten lead is therefore considerably cooled by the sleeve 13 before its heat is transmitted to the ductile pipe. The outer sleeve therefore protects the ductile pipe sufficiently to prevent melting of the pipe. The internal surface of the pipe 12 in Fig. 1 is cylindric, but the internal surface of the pipe 12' of Fig. 2 is frusto-conical, being larger at its inner end and smaller at its outer end. By virtue of this formation, the lead 22 is locked with the pipe 12' so that it cannot be pulled out. The outer sleeve 13 is in turn locked in the pipe 12' by the lead 22. The ductile pipe 11 is locked in the sleeve 13 because its inner end is flared, and the flared end of the ductile pipe is positively maintained in that condition by the inner sleeve 14. If the pipes 10 and 11 should be subjected to any longitudinal movement tending to pull them apart, the inner sleeve 14 would remain stationary with relation to the ductile pipe, being tightly engaged therewith. Any longitudinal movement would therefore cause the coupling to bind more tightly upon the ductile pipe and upon the molten lead 22.

Although the present invention is intended primarily for coupling a cylindric pipe of ductile material with a larger pipe of hard, rigid material, it is by no means limited in this respect. For example, a coupling possessing the same features may be used for coupling a ductile pipe and a hard pipe of equal diameter, as shown by Fig. 5. In this form the hard pipe is indicated at 30, the ductile pipe is indicated at 31, and the outer and inner sleeves are indicated respectively at 33 and 34. The coupling sleeves are applied in the same relative order as that explained in connection with the forms shown by Figs. 1 and 2. Any convenient means may be provided for attaching the outer sleeve to the hard pipe. For example, the hard pipe may be provided with an external screw thread, as indicated at 35. The outer sleeve is internally threaded to engage the thread 35. In this form the larger end of the inner sleeve 34 abuts against the end of the hard pipe, and the coöperating screw threads may be utilized as means for driving the inner sleeve tightly against the flared end of the ductile pipe. In attaching this coupling to a threaded pipe, it is not necessary to rotate the coupling sleeves with relation to the ductile pipe. For example, the ductile pipe and the two sleeves may remain stationary while the hard pipe is rotated to tighten the connection, and in this event the tightening of the connection would not have any tendency to injure the ductile pipe.

One important advantage of a coupling of this character is that the ductile pipe does not require any preliminary preparation such as flaring or contracting the end which is to be coupled. The coupling, as already stated, is applied to the ductile pipe when the said pipe is cylindrical in form. The flaring of the pipe is effected automatically when the inner sleeve is inserted. The ductile pipe cannot be withdrawn from the outer sleeve so long as the inner sleeve remains within the pipe, and the inner sleeve is entirely out of reach when the coupling is completed, thereby preventing the possibility of being dislodged either accidentally or mischievously. In other words, the coupling is fool-proof and cannot become loosened unless and until the outer members are entirely removed in order to permit the removal of the inner sleeve.

I claim:

In a pipe joint, the combination with a hard pipe having a bell end provided with an internal annular shoulder and a ductile pipe extending into said bell end, of an inner coupling sleeve having a conical outer surface and an end flange and fitted into the end of the ductile pipe within the bell to expand the same into conical shape, said inner coupling sleeve having its flange resting on the shoulder of the bell end of the hard pipe, an outer coupling sleeve surrounding the end of the ductile pipe within the bell end and provided with an end flange and having a conical portion adjacent said flange, the end flanges of the inner and outer sleeves clamping between them the edge of the conical end portion of the ductile pipe, the outer sleeve extending beyond the open end of the bell end and said sleeve being of smaller diameter than the bell end, and sealing means in said bell end.

In testimony whereof I have affixed my signature, in presence of two witnesses.

DAVID W. ROSS.

Witnesses:
W. P. ABELL,
P. W. PEZZETTI.

Copies of this patent may be obtained for five cents each, by addressing the "Commissioner of Patents, Washington, D. C."